Patented Aug. 1, 1950

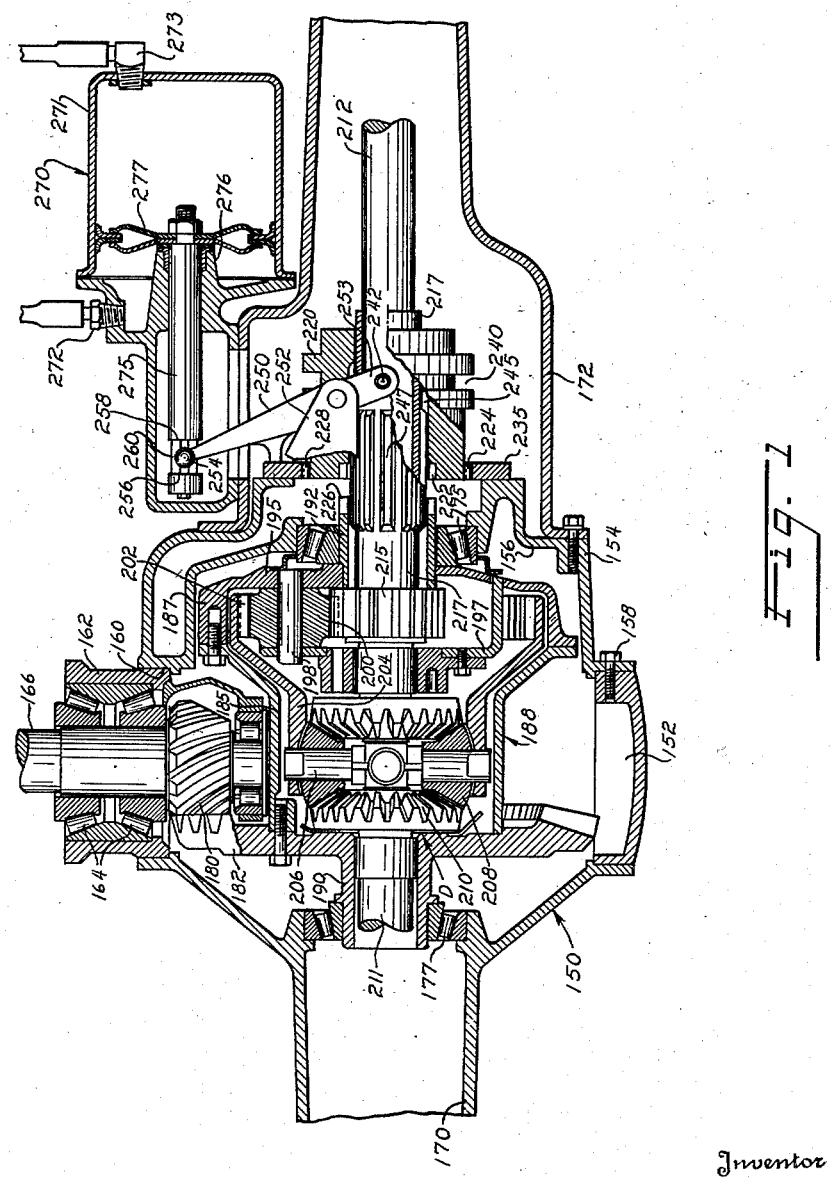

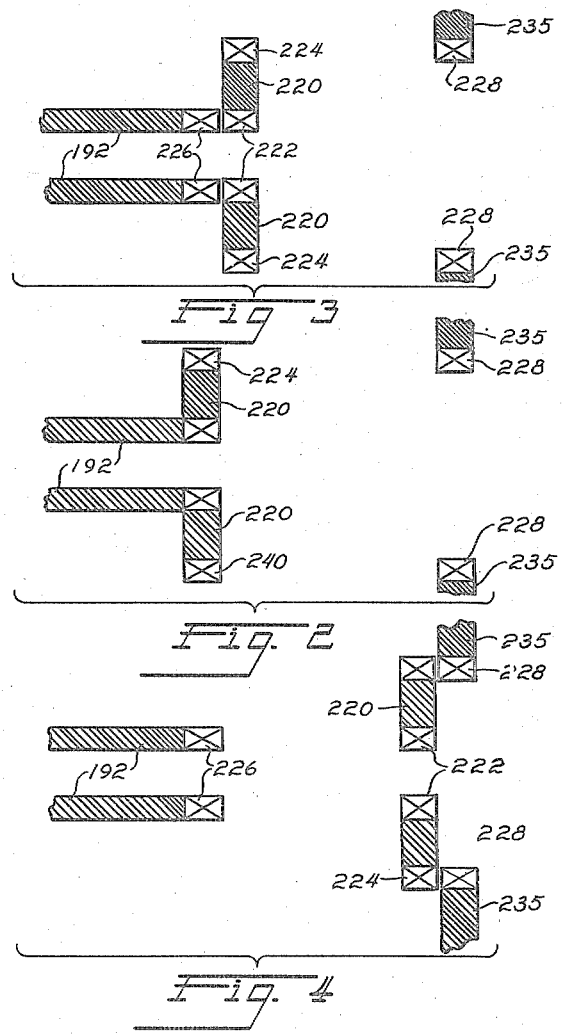

2,516,850

UNITED STATES PATENT OFFICE 2,516,850

PLANETARY SHIFT MECHANISM

Nelson R. Brownyer, Birmingham, Mich., assignor to The Timken-Detroit Axle Company, Detroit, Mich., a corporation of Ohio Original application July 13, 1944, Serial No. 544,716, now Patent No. 2,398,407, dated April 16, 1946. Divided and this application November 1, 1945, Serial No. 625,991

4 Claims. (Cl. 74—695)

The present invention relates to power transmission mechanisms and to controls for such mechanisms and is a division of my application, Serial No. 544,716, filed July 13, 1944, for Power Transmission Mechanism, now United States Letters Patent No. 2,398,407, issued April 16, 1946. More particularly, the invention herein relates to power operated multiple-speed power transmissions incorporated in planetary axles for internal combustion engine powered vehicles.

Early manually shifted automotive speed changing transmissions incorporated in multi-speed axles comprised comparatively simple mechanical toothed clutching devices, but to change their speed ratios without clashing or stripping the gears required much experience and a high degree of skill and even a skilled operator could not always make a shift without damage to the mechanism.

The difficulty is greatly increased in two speed truck axles, because of the large rotational inertia of the parts involved. The use of such multi-speed mechanism has also necessitated the addition of control levers to the crowded modern truck cabs, cramping the driving space, and increasing the difficulties and hazards of driving. In spite of these difficulties, however, such two speed axles have gone into rapidly increasing use in recent years because they may be readily installed in place of standard truck axles, and their use doubles the number of speed ratios obtainable with the conventional truck transmissions only, thus eliminating the need for more complicated multiple speed transmissions in heavy trucking service and permitting the low cost conversion of standard low priced comparatively low powered trucks for heavy duty use.

Early efforts to minimize such shifting difficulties followed the obvious mechanical expedient course of trying to make the meshing of the teeth easier by increasing the clearances between the engaging teeth, chamfering or rounding off the tooth corners, tapering the teeth and/or making alternate engaging clutch teeth long and short, as exemplified in Patent No. 2,183,667, issued December 19, 1939, to Lawrence R. Buckendale, for Dual Ratio Drive Axle. These expedients have failed to solve the problem because they tend to permit the clutch parts to engage readily before their speeds are synchronized, causing severe jerks and shocks, and subjecting the entire driving train to severe strains resulting in premature failures of the associated parts.

To overcome these difficulties, relatively vast sums of money and amounts of time were then spent to develop complicated and costly clutch synchronizing devices to synchronize the clutch parts prior to engagement, and thereby reduce wear and tear on the mechanisms incident to shifting, especially by careless operators. While such synchronizing devices facilitate shifting and have been generally adopted in conventional types of automotive transmissions, because of their added complications and costs, they have not been applied in the two-speed truck axles heretofore on the market.

Recently, however, a demand has arisen for the application of automatic or semi-automatic power shifting mechanisms to two-speed axles which give the driver no opportunity to even attempt, by the exercise of necessary skill, to mesh the gears without shock or clash.

To meet this situation, it has heretofore been deemed necessary to incorporate synchronizing devices in power shifted two speed axles, and then to provide complicated delayed action controls to prevent premature engagement of the parts before the synchronizer could become effective, as disclosed in Harper et al. Patent No. 2,071,165, granted February 16, 1937. This patent shows a power shift embodying a frictional synchronizer clutch and delayed action control for the vacuum cylinder which causes a predetermined dwell or lag during the shift operation, by permitting synchronization to take place. This type of axle has gone into use as optional equipment on pleasure cars provided with a control valve interconnected with the clutch pedal to insure proper shifting. These controls are costly, introduce mechanical complications, and have not as yet gone into standard production for any automotive use.

Instead of making the clutch members easy to engage, and then providing complicated and costly synchronizing and control devices to prevent premature engagement, I have discovered that by making the interengaging clutch teeth difficult to engage, through the use of smooth, parallel abutting ends having sharp corners, properly restricted engaging clearances, and properly proportioned engaging and disengaging pressures, toothed clutch constructions may be produced which can be shifted silently and without shock, either manually or by power means under any conditions of vehicle speed and load, and without the need of any form of friction clutch. When the clutch members constructed in accordance with my invention are rotating relatively and their parallel tooth ends are brought into engagement with a force whose magnitude bears a proper relationship to the sizes of the parts and the area of the tooth ends, I have found in practice that the tooth ends smoothly rub on each other and remain out of meshing engagement until their speeds are synchronized. At the moment of substantial synchronism they quickly mesh without shock.

In test trucks equipped with a two-speed axle having my improved vacuum operated clutch, many shifts have been repeatedly carried out under all possible operating conditions without operating the clutch pedal, and yet it was found substantially impossible to produce noise or shock of any kind under normal operating conditions.

In my parent application S. N. 544,716, filed July 13, 1944, I have claimed the invention broadly and also as specifically applied to a two-speed double reduction spur gear type axle. The purpose of the present claims is to protect that embodiment of the invention represented by its incorporations in a planetary two speed drive axle.

It is the object of the invention herein to provide a novel shift mechanism for a planetary two speed drive axle wherein a member toothed at opposite ends is shiftable into mesh with teeth rotatable with the planet gear carrier of the planetary axle for coupling the carrier to the sun gear or into mesh with relatively stationary teeth in the axle for locking the sun gear against rotation, wherein the meshing teeth having their confronting end faces smooth and parallel so as to slide upon each other until synchronized and wherein the torque transmitting side surfaces of the teeth join those end faces along sharp edges for precluding intermeshing prior to exact synchronization.

Further objects of the invention will become apparent as the invention proceeds in connection with the appended claims and the annexed drawings wherein;

Figure 1 is a horizontal section through a planetary two speed drive axle embodying the invention;

Figures 2, 3, and 4 are fragmentary sectional views illustrating the relation of the meshable teeth in overdrive, neutral and direct drive positions respectively;

Figure 5:
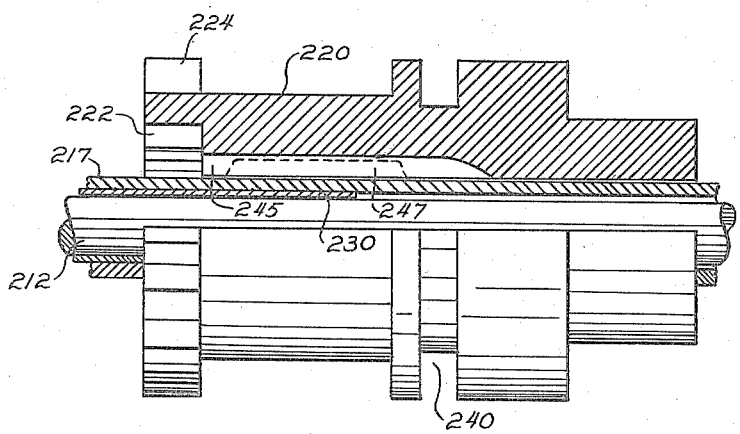
Figure 5 is a longitudinal sectional view on an enlarged scale of the shiftable toothed collar of Figure 1.

The illustrated embodiment of the invention has radial as well as axial intermeshing teeth formed according to the invention and embodied in a planetary two-speed axle of substantially the same design as disclosed in Wiedmaier Patent No. 1,815,689, granted July 21, 1931.

Referring to Figure 1, an axle housing comprises a center section 150 having an annular inner portion 152 and an annular end portion 154 provided with an integral support web 156, these two annular portions being secured together as by cap screws 158.

Forwardly, axle center section 150 is provided with a circular opening 160 in which is supported a pinion bearing cage 162 seating twin roller bearings 164 in which pinion shaft 166 is rotatably mounted.

Secured to and extending axially from annular portion 152 is a hollow axle arm 170. Oppositely extending hollow axle arm 172 is secured to and extends from annular portion 154. Bearing support member 156 and axle arm 170 are provided with roller bearings 175 and 177 in which is rotatably supported the transmission mechanism to be described.

The pinion shaft 166, which is coupled at its forward end to the vehicle propeller shaft (not shown), extends rearwardly, terminating within the center portion of the axle housing in a bevel pinion 180. The bevel pinion 180 meshes with a bevel ring gear 182 which with generally cup-shaped housing sections 185 and 187 constitutes a rigid planetary gear housing, generally indicated at 188. The housing 188 is rotatably supported at one end in roller bearing 177 by an axially extending boss 190 integral with bevel ring gear 182 and its opposite end by an axially extending tubular boss 192 rotatably supported in roller bearing 175.

The cup-shaped portion 187 of planet housing 188 has a wall 195 substantially transversely disposed with respect to its rotational axis and is provided with a corresponding transversely disposed web 197 axially inwardly spaced from said wall. Wall 195 and the axially inwardly transversely disposed web 197 are connected by a desired number of planet pinion pins, one of which is indicated at 198. On the planet pinion pins, which are substantially equally radially spaced and parallel to the rotational axis of the planet housing, are journalled planet pinions, as indicated at 200.

The planet pinions 200 mesh with an internally toothed ring gear 202 which is carried by a generally frustro-conical member 204 secured to the spider 206 of the conventional differential D, comprising spider 206, differential pinions 208 and differential side gears 210. Side gears 210 are integral with axle shafts 211 and 212.

The teeth of planet pinions 200 mesh inwardly with the teeth of sun gear 215 integral with an axially extending quill 217 through which axle shaft 212 extends and on which a toothed collar 220, which will be more fully described, is axially slidably mounted.

For the purpose of effecting either one of the two axle ratios, axially shiftable toothed collar 220 is arranged to selectively connect planet sun gear 215 to planet housing 188 through the boss 192, rigid with the planetary gear housing, or to the relatively stationary axle housing through the fixed toothed brake member 235 secured in any conventional manner to annular section 154 of the axle housing.

Boss 192 is formed with end teeth 226 adapted to mesh with internal teeth 222 on collar 220 and brake 235 is formed with internal teeth 228 adapted to mesh with teeth 224 on collar 220, as illustrated in Figure 1.

When toothed collar 220 is in its extreme left position in Figure 1, teeth 222 and 226 are meshed and thus locks sun gear 215 to planet housing 188 so that power transmitted through the pinion shaft 166, bevel pinion 180, and bevel ring gear 182 to planet housing 188 will rotate the planet pinions, planet housing, and planet sun gear as a unit, whereby power is transmitted directly to axle shafts 211 and 212 through the differential. In the illustrated right hand position of collar 220 in Figure 1, teeth 224 and 228 are meshed and collar 220 connects sun gear 215 to the axle housing whereby the bevel gear set and planet housing will drive the planet pinions about sun gear 215 thus driving the planet ring gear and consequently the axle shafts at a greater speed than that of the planet housing. The invention may equally well be applied to an underdrive.

Collar 220 is provided with an external annular groove 240 into which radially directed trunnions 242 project to axially shift the collar axially on mating internal and external splines 245 and 247 on collar 220 and quill 217 respectively. The weight of collar 220 has a direct effect upon the shifting characteristics of the mechanism and the tendency of the teeth on the collar to disengage from and to intermesh with their mating teeth. Synchronism depends to some extent upon the inertia of the collar. I have found that a collar weighing approximately 35 ounces in a mechanism of the size hereinafter disclosed is satisfactory.

In this shift mechanism it is very important that proper relationship be established between the shapes and areas of the ends of the intermeshing teeth as well as the back-lash between the teeth and the length of the contact surfaces between the teeth when they are intermeshed.

It is essential that the cooperating end faces of the collar teeth and the teeth adapted to mesh therewith and which abut before engagement and intermeshing be smooth and lie in parallel surfaces of revolution generated by a pair of lines rotated about points on the axis of rotation of the collar, and that all of the smooth end faces have sharp corners free from rounded or chamfered edges where joined to the torque transmitting surfaces of the teeth. The area of the end faces of the teeth and the length of the teeth with relations to the back-lash or clearances must be correlated to the pressures tending to engage the teeth after abutment in order that the teeth will properly engage and mesh upon substantial synchronism, but will not tend to intermesh before that time, thus avoiding burring or chipping the sharp edges. These factors may be varied to meet various conditions and circumstances.

In order to insure their smooth sliding action of the contacting tooth ends before driving or locking engagement takes places, the abutting ends of tooth sets 222, 226, and 224, 228 are accurately ground so that these end surfaces lie as closely as machine tolerances will permit upon a surface of revolution generated about the axis of rotation of the clutch collar, and the edge between these flat smooth end surfaces and the side and top surfaces of each tooth is square and sharp without chamfer or burr. Otherwise the conditions are as set forth in said Serial No. 544,716.

The pressure to engage and mesh the teeth should be yieldingly and lightly but positively applied and sufficient to complete the intermeshing upon the substantial synchronism between the mating teeth. It has been found that the disengaging power should be of sufficient magnitude, which is substantially greater than that of the engaging power, to assure swift disengagement after preselection and torque interruption to avoid the possible of the collar teeth being caught upon torque reversal thus interrupting the shift sequence.

In the practical application of my invention to a planetary two-speed overdrive axle for a medium size passenger car, I have found the following relationships to provide a very satisfactory mechanism.

The overall gear ratio on this unit between pinion shaft 166 and axle shafts 211 and 212 is 4.11 to 1 in direct ratio and 3.65 to 1 in overdrive ratio.

Eight equally spaced axially directed housing teeth 226 have the following approximate dimensions: Outside diameter of 2"; length of ¼". Eight inwardly directed, mating radial teeth 222 have a root diameter of 2"; an inside diameter of 1.6"; and a length of ¼".

Twelve equally spaced inwardly directed, stationary radial teeth 228 have the following approximate dimensions: Root diameter of ¾"; inside diameter of 3". Twelve outwardly directed, mating radial teeth 224 have an outside diameter of 3¼"; an inside diameter of 3"; and a length of ¼".

The relationship of the chordal width of the mating teeth is as near equal as practicable, being varied only to the extent necessary to maintain a backlash of approximately .015" to .025" therebetween.

Collar 220 may be shifted by any suitable means. Shown in Fig. 1 is lever 250 journalled for rocking movement on fixed member 252 which is secured to annular portion 154. The upper arm of lever 250 is provided at its end with a substantially spherical portion 254 for optional contact with the sides 256 and 258 of a lateral slot 260 in a piston rod 275. The lower lever arm is bifurcated providing a yoke 253 into which are secured the trunnions 242 disposed in groove 240 of collar 220.

In order that sun gear 215 may have sufficient freedom of self centering movement relative to the planet gears to equalize the tooth pressures between the sun gear and the various planet gears, it is desirable that the quill 217 have a limited amount of radial floating movement relative to the axle shaft 212. However, as too great a freedom of floating movement would interfere with the centering of the collar teeth 222 and 224 relative to their mating teeth 226 and 228, means are provided to limit the radial floating movement of the quill. This means may convenient comprise a bushing 230 (Figure 5) disposed between the quill and the axle shaft to prevent forces, such as the weight of the collar, acting on the quill from causing misalignment of the clutch teeth. A bushing having an internal diameter approximately 0.005" greater than the external diameter of the axle shaft and an external diameter approximately the same as the internal diameter of the quill has been found satisfactory for this purpose.

In Figure 1, I disclose a vacuum motor, generally indicated as 270, comprising a cylinder 271, conduit nipples 272 and 273, piston 277, and piston rod 275, secured to axle arm 172 in any conventional manner. Conduits 272 and 273 are provided to optionally apply intake vacuum of the vehicle engine to the desired side of the piston 277 in order that the piston may exert thrust on the piston rod 275 to which it is attached in the desired direction.

The effective area of piston 277 is such that the vacuum normally exerts a pull of approximately 80 pounds pressure on the piston rod 275 which in turn transmits this pressure to the substantially spherical end 254 on lever 250. In view of the fact that the leverage ratio of the shift lever is approximately 3½ to 1, a pressure of approximately 250 pounds is initially exerted to disengage the teeth 222 and 226 or 224 and 228.

Figure 6:
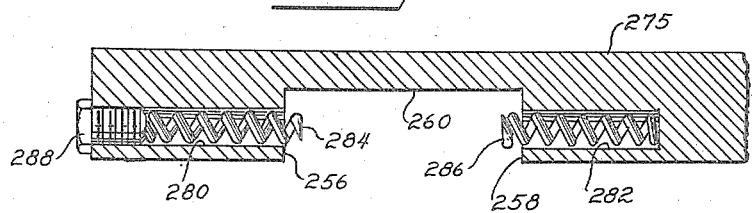
Figure 6 is a longitudinal sectional view on an enlarged scale of a fragmentary portion of the shift rod shown in Figure 1.

The width of the slot 260 in rod 275 is approximately equal to the diameter of the spherical end 266 of the lever plus the depth of engagement of the teeth 222 and 226 and clutch teeth 224 and 228. Also provided in the piston rod are bores 280 and 282 (Figure 6) into which are inserted coil springs 284 and 286 respectively. The outer end of the bore 280 is tapped to accomodate closure cap screw 288. The size of the coil springs is determined by the magnitude of pressure necessary to intermesh the mating teeth.

As will be more fully explained, the reciprocable piston merely disengages one set of teeth and moves the other set of mating teeth to a point short of sliding engagement, coil spring 284 or 286 functioning as the only power means effective to mesh the mating teeth.

In one direction of travel, contact of piston 277 with annular member 276 on cylinder member 271 limits the length of travel of the piston rod 275, while in the opposite direction of travel the engagement of the outer end of piston rod 275 with the end of the vacuum cylinder 271 limits the length of travel of the piston rod.

Coil springs 284 or 286 exerting a pressure of approximately 35 pounds have been found satisfactory to intermesh the mating teeth after substantial synchronism without clashing or raking of the teeth before intermeshing.

Any one of the many known types of valve construction may be employed to optionally connect vacuum cylinder conduits 272 or 273 to the engine vacuum as disclosed in said S. N. 544,716.

*Operation*

As shown in Figure 1, the device is in overdrive or high speed ratio, sun gear 215 being locked to stationary member 235 through the external splines 247 on the quill 217 and the mating internal splines 245 in the collar 220, and the external teeth 224 on collar 220 and the internal teeth 228 on the stationary member.

To shift to low or direct drive speed ratio, the vacuum piston 277 is caused to move to the right from the position illustrated, by the action of the engine vacuum applied through nipple 273 by a suitable control valve.

The initial movement of the piston rod 275 compresses coil spring 284. The compression of the spring causes face 256 of the lateral slot 260 to contact the spherical end 254 at the end of the shift lever 250. Continued movement of the piston rod to the right moves the yoke 253 to the left. Trunnion 242 in turn moves clutch collar 220 to the left and causes teeth 224 to disengage from teeth 228. The disengagement is extremely rapid as the piston 277 is operating at its greatest power produced by the high engine vacuum. Swift disengagement is essential as the teeth must disengage before torque reversal interferes with the shift sequence. Movement of the rod continues until the outer end of rod 275 abuts the end of the cylinder 271. The movement of the rod is of such a predetermined distance as to move the flat-faced, sharp edged teeth 222 only approximately into abutting engagement with the mating, flat surfaced, sharp edged teeth 226 of the planet housing. Upon, and not until, substantial synchronism of the collar and the planet housing, the pressure exerted by the still substantially fully compressed spring 284, which has caused teeth 222 to contact teeth 226, forces teeth 222 of the collar into full intermeshing engagement with the teeth 226 of the planet housing.

When the collar 220 is disengaged from the stationary teeth 228, the planet sun gear 215 becomes a free member, its rotation being controlled by the direction and speed of rotation of the planet ring gear 202 and planet housing 188.

Assuming the collar 220 to be disengaged from both its mating sets teeth 226 and 228, the planet ring gear speed and direction is controlled by the speed and direction of the vehicle wheels (not shown) to which it is coupled by the axle shafts 211 and 212, differential D and frustro-conical shaped member 204. The forward motion of the vehicle in normal operation rotates its wheels in a clockwise direction. This in turn rotates the planet ring gear 202 to which the wheels are coupled in a clockwise direction.

The speed of rotation of the planet housing 188 is controlled by the speed of rotation of the engine to which it is coupled by the propeller shaft (not shown), bevel pinion 180 and bevel ring gear 182.

The speed and direction of rotation of the planet pinion 200, and consequently that of the planet sun gear 215, is determined by the relative speed of rotation and direction of travel of the planet housing 188 and planet ring gear 202.

Upon deceleration of the engine for torque interruption and disengagement of the teeth, the speed of the planet housing decelerates. When the speed of the planet housing becomes less than that of the ring gear, the ring gear tends to rotate the planet pinions 200 on their pins 198 in a clock-wise direction. As it is necessary to synchronize the speed of the planet sun gear with that of the planet housing it is necessary to accelerate the engine, and consequently the planet housing, to reverse the direction of rotation of the sun gear. When the engine is accelerated until the speed of the planet housing equals the speed of the planet ring gear, the planet pinions are not rotating on their axis and consequently the sun gear rotates at a speed equal to that of the planet housing, that is, the planet housing speed and the planet sun gear speed are synchronized, at which time the teeth 222 and 226 intermesh by the action of the still compressed spring 284 and the planet housing, pinion, sun gear, and ring gear are interlocked and rotate as a unit.

Conversely, in shifting from direct or low ratio to overdrive, teeth 222 and 226 are disengaged and the engine is decelerated while the speed of the planet ring gear 202, to which the vehicle wheels are coupled, tends to remain substantially the same. With the engine decelerating, and conscquently the speed of the planet housing 188 decelerating, the ring gear 202 tends to rotate the pinions 200 on their pins in a clock-wise direction. This clockwise rotation of the p:anet pinions tends to rotate the sun gear 215 in a counter-clockwise direction. The effect of this tendency to reverse the rotation of the planet sun gear is to reduce the speed of rotation of the planet sun gear to zero, at which time the collar teeth 224 engage with the teeth 228 by the action of the compressed spring 286.

When the parts are in this position, as shown in Figure 1 and the vehicle is in forward motion, for example, the clockwise rotation of the bevel pinion 180 rotates the bevel ring gear 182 in a counter-clockwise direction. Planet pinions 200 journalled on their pins rotate with the housing as a unit in a clockwise direction about the fixed sun gear 215 driving the planet ring gear 202 at a speed greater than that of the bevel ring gear 182 in a clockwise direction. The planet ring gear drives differential D, the axle shafts 211 and 212, and the wheels with which it is coupled, in the same direction.

Figure 7:
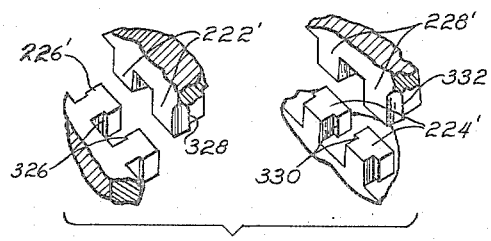
Figure 7 is a perspective view of fragmentary portions of the toothed mechanism of Figure 1 showing a modified tooth construction to provide a locking function.

In Figure 7 there is illustrated a modified tooth construction for the meshable teeth of Figure 1. In this arrangement, the teeth are provided on their sides or working faces with slight offsets or shoulders which overlap to maintain intermeshed teeth against disengagement during the transmission of power in either direction.

In the arrangement illustrated, teeth 226', corresponding to the teeth 226 of Figure 1 are provided intermediate the length of each side face with a lateral shoulder as indicated at 326 making the teeth somewhat T-shaped in plan. The lateral extent of each shoulder, however, is only a few thousandths of an inch. Teeth 222' corresponding to teeth 222 of Figure 1, are provided along their side or working faces with corresponding lateral shoulders, as indicated at 328. The shoulders 326 and 328 are so located along the length of the teeth that when the teeth 222' are fully meshed with teeth 226' shoulders 328 overlap or hook over shoulders 326 and prevent disengagement of the teeth while power is being transmitted in either direction. The larger portions of teeth 222' will, however, pass between the larger portions of teeth 226' so that, upon cessation or interruption of power transmission through the intermeshed teeth, teeth 222' may be drawn away from teeth 226' to discontinue the drive therethrough. The teeth of these two sets may also be readily engaged in the manner described above in connection with Figures 1 to 4, inclusive.

Teeth 224', corresponding to teeth 224 of Figure 5, and 228', corresponding to 228 of Figure 1, are also provided with lateral offsets or shoulders as indicated at 330 and 332 respectively, which cooperate in the same manner as shoulders 326 and 328 on teeth 226' and 222' to maintain teeth 224' and 228' in engagement during transmission of power therethrough. These teeth may also be engaged and disengaged under conditions of relative synchronization in the manner hereinabove described.

From the foregoing disclosure of the invention it is apparent that I have provided a novel multiple speed power transmitting mechanism which is of extremely simple design, enables the shift into low or high gear ratio to be carried out in a minimum of time under any and all vehicle speed and load conditions, silently and without clash or jerk, and without disengaging the vehicle clutch, and it also embodies novel control means which make it possible to pre-select the desired gear ratio at any desired instant and to subsequently carry out the shift by manipulating the vehicle accelerator, and which also shifts into one ratio if the engine should stall.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a gear drive mechanism, a housing, a bevel gear train journalled in said housing, a shaft driven by said bevel gear train, a planetary gear train mounted in said housing and drivingly interposed between said bevel gear train and said shaft, and means selectively operable to either lock said planetary gear train to provide a direct drive between said bevel gear train and said shaft or to drive said shaft through the planetary gear train to provide a different drive speed of said shaft comprising a sun gear in said planetary gear train, an axially shiftable collar operatively associated with said sun gear fixed against rotation relative thereto and having two sets of teeth thereon, a member operatively associated with said bevel gear train fixed against rotation relative thereto and having a set of teeth engageable by one of said sets of collar teeth, a member secured to said housing and having a set of teeth engageable by the other set of collar teeth, and means for shifting said collar between a position in which it engages the teeth on said bevel gear train associated member and a position in which it engages the teeth on said housing carried member, the adjacent ends of said teeth having smooth faces so shaped and of such relative areas and the meshing teeth having such degrees of back-lash that when brought into engagement they will abut in sliding engagement in a common surface of revolution generated by a line rotated about the axis of rotation of said sun gear and will slide relatively without burring or clashing while tending to synchronize and having torque transmitting surfaces joining said smooth end faces along sharp edges, whereby any appreciable tendency for said teeth to undergo relative axial movement beyond said common surface of sliding engagement is precluded until their speeds are substantially synchronized.

2. In combination with a planetary gear train having a sun gear, planet gears meshed with said sun gear and journalled in a planet gear carrier and a ring gear meshed with said planet gears, shiftable speed change means for selectively locking said sun gear to said planet gear carrier or for holding said sun gear against rotation about its axis comprising a tubular member secured at one end to said carrier and provided at the opposite end with axially disposed teeth having their end faces totally disposed in a surface of revolution generated by a line rotated about a point on the rotational axis of said carrier, an apertured member fixed relative to said carrier and provided with radially directed teeth around said aperture, said teeth having end surfaces facing said carrier lying wholly within a surface of revolution generated by a line rotated about a point on the rotational axis of said carrier, and an axially shiftable member operatively associated with said sun gear fixed against rotation relative thereto having a set of external teeth engageable with the teeth on said fixed member and having end surfaces facing said fixed member lying wholly within a surface of revolution generated by a line rotated about a point on said axis of rotation, and having teeth engageable with the teeth on said tubular member having end surfaces facing said tubular member lying wholly within a surface of revolution generated by a line rotated about a point on said rotational axis, the adjacent end faces of all of said teeth being smooth and so shaped and of such relative areas and the meshing teeth having such degrees of back-lash that when brought into engagement they will abut in sliding engagement in a common surface of revolution and will slide relatively without burring or clashing while tending to synchronize and having torque transmitting surfaces joining said smooth end faces along sharp edges, whereby any appreciable tendency for said teeth to undergo relative axial movement beyond said common plane of sliding engagement is precluded until their speeds are substantially synchronized.

3. In combination with a relatively stationary housing enclosing a planetary gear train having a sun gear, a rotatable planetary gear carrier, and planet gears journaled in said rotatable planet gear carrier in constant mesh with said sun gear; shiftable speed change for selectively locking said sun gear to said planet gear carrier or for holding said sun gear against rotation about its axis comprising an axially shiftable member having a set of teeth thereon, means non-rotatably connecting said member to said sun gear, a cooperating set of teeth on said housing adapted to be meshed with said teeth on said shiftable member in one shifted position of said member for locking said sun gear against rotation, a second set of teeth on said shiftable member and a cooperating set of teeth on said planetary gear carrier adapted to be meshed therewith in another shifted position of said shiftable member for locking said carrier to the sun gear, the adjacent ends of said teeth having smooth faces so shaped and of such relative areas and the meshing teeth having such degrees of back-lash that when brought into engagement they will abut in sliding engagement in a common surface of revolution generated by a line rotated about the axis of rotation of said sun gear and will slide relatively without burring or clashing while tending to synchronize and having torque transmitting surfaces joining said smooth end faces along sharp edges, whereby any appreciable tendency for said teeth to undergo relative axial movement beyond said common surface of sliding engagement is precluded until their speeds are substantially synchronized.

4. In combination with a stationary drive axle housing enclosing a planetary gear train having a sun gear, a rotatable planetary gear carrier, and planet gears journalled on said rotatable gear carrier and in constant mesh with said sun gear; means for controlling said planetary gear train for selecting the drive speed of the axle comprising an axially shiftable member having a set of teeth thereon, means non-rotatably connecting said member to said sun gear, a cooperating set of teeth on said housing adapted to be meshed with said teeth on said shiftable member in one shifted position of said member for locking said sun gear against rotation, a second set of teeth on said shiftable member and a cooperating set of teeth on said planetary gear carrier adapted to be meshed therewith in another shifted position of said shiftable member for locking the carrier to the sun gear, the adjacent ends of said teeth having smooth faces so shaped and of such relative areas and the meshing teeth having such degrees of backlash that when brought into engagement they will abut in sliding engagement in a common surface of revolution generated by a line rotated about the axis of rotation of the sun gear, and will slide relatively without burring or clashing while tending to synchronize, whereby any appreciable tendency for said teeth to undergo relative axial movement beyond said common surface of sliding engagement is precluded until their speeds are synchronized, and actuating means for applying shifting forces to said shiftable member for engaging and disengaging said meshable teeth comprising a device that sequentially exerts a shifting pressure of predetermined magnitude for disengaging meshed tooth sets and a shifting pressure materially lower than said predetermined pressure for engaging meshable tooth sets, and interlocking means between said meshable tooth sets for preventing disengagement until driving torque is relieved and said predetermined shifting pressure is applied.

NELSON R. BROWNYER.

REFERENCES CITED

The following references are of record in the file of this patent:

UNITED STATES PATENTS

| Number | Name | Date |
|---|---|---|
| 1,815,689 | Wiedmaier | July 21, 1931 |
| 2,015,108 | Harper | Sept. 24, 1935 |
| 2,056,303 | Starr | Oct. 6, 1936 |
| 2,326,751 | Buckendale | Aug. 17, 1943 |
| 2,398,407 | Brownyer | Apr. 16, 1946 |

Certificate of Correction

Patent No. 2,516,850　　　　　　　　　　　　　　　　　　　　August 1, 1950

NELSON R. BROWNYER

It is hereby certified that error appears in the printed specification of the above numbered patent requiring correction as follows:

Column 3, line 70, before the word "support" insert *bearing*; column 5, line 50, for "places" read *place*; line 70, for "possible" read *possibility*; column 6, line 15, for "3/4" read *3¼*; line 47, for "convenient" read *conveniently*; column 9, line 74, for "claime" read *claims*; column 11, line 17, after "change" insert *means*;

and that the said Letters Patent should be read as corrected above, so that the same may conform to the record of the case in the Patent Office.

Signed and sealed this 17th day of October, A. D. 1950.

[SEAL]

THOMAS F. MURPHY,
*Assistant Commissioner of Patents.*